United States Patent
Budd et al.

(10) Patent No.: US 9,395,490 B2
(45) Date of Patent: Jul. 19, 2016

(54) VARIABLE BURIED OXIDE THICKNESS FOR A WAVEGUIDE

(71) Applicant: International Business Machines Corporation, Armonk, NY (US)

(72) Inventors: Russell A. Budd, North Salem, NY (US); Effendi Leobandung, Stormville, NY (US); Ning Li, White Plains, NY (US); Jean-Olivier Plouchart, New York, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/982,603

(22) Filed: Dec. 29, 2015

(65) Prior Publication Data

US 2016/0116673 A1  Apr. 28, 2016

Related U.S. Application Data (63) Continuation of application No. 14/518,142, filed on Oct. 20, 2014.

(51) Int. Cl.
```
G02B 6/43      (2006.01)
G02B 6/132     (2006.01)
G02B 6/136     (2006.01)
G02B 6/12      (2006.01)
G02B 6/42      (2006.01)
G02B 6/122     (2006.01)
```

(52) U.S. Cl.
CPC .............. G02B 6/132 (2013.01); G02B 6/136 (2013.01); G02B 6/43 (2013.01); G02B 6/122 (2013.01); G02B 6/4295 (2013.01); G02B 6/4296 (2013.01); G02B 2006/121 (2013.01); G02B 2006/12121 (2013.01); G02B 2006/12135 (2013.01)

(58) Field of Classification Search
CPC .............. G02B 2006/121; G02B 2006/12121; G02B 2006/12135
See application file for complete search history.

(56) References Cited

U.S. PATENT DOCUMENTS

| | | | |
|---|---|---|---|
| 4,711,514 A | 12/1987 | Tangonan et al. | |
| 6,403,393 B1 * | 6/2002 | Adkisson | G02B 6/122 216/24 |
| 7,812,397 B2 | 10/2010 | Cheng et al. | |
| 8,213,751 B1 | 7/2012 | Ho et al. | |

(Continued)

OTHER PUBLICATIONS

List of IBM Patents or Patent Applications Treated as Related, dated Dec. 29, 2015, 2 pages.

*Primary Examiner* — Jerry Rahll
(74) *Attorney, Agent, or Firm* — Scully, Scott, Murphy & Presser, P.C.; Louis J. Percello, Esq.

(57) ABSTRACT

A semiconductor structure is provided in which a plurality of waveguide structures are embedded within a semiconductor handle substrate. Each waveguide structure includes, from bottom to top, a bottom oxide portion, a waveguide core material portion and a top oxide portion. An oxide capping layer is present on topmost surfaces of each waveguide structure and a topmost surface of the semiconductor handle substrate. A plurality of semiconductor devices is located above a topmost surface of the oxide capping layer. The structure has thicker buried oxide regions defined by the combined thicknesses of the top oxide portion and the oxide capping layer located in some areas, while thinner buried oxide regions defined only by the thickness of the oxide capping layer are present in other areas of the structure.

9 Claims, 8 Drawing Sheets

(56) References Cited

U.S. PATENT DOCUMENTS

| | | |
|---|---|---|
| 2009/0311834 A1 | 12/2009 | Fenouillet-Beranger et al. |
| 2011/0235962 A1 | 9/2011 | Shubin et al. |
| 2013/0137202 A1 | 5/2013 | Assefa et al. |
| 2013/0209026 A1 | 8/2013 | Doany et al. |

\* cited by examiner

FIG. 11

VARIABLE BURIED OXIDE THICKNESS FOR A WAVEGUIDE

BACKGROUND

The present application relates to a semiconductor structure and a method of forming the same. More particularly, the present application relates to a semiconductor structure including a plurality of waveguide structures embedded within a semiconductor handle substrate and including a buried oxide having a variable thickness located atop the semiconductor handle substrate and each waveguide structure of the plurality of waveguide structures and a method of forming such a semiconductor structure.

Optical devices can be made on silicon substrates, because silicon provides many benefits for optical communication. For example, the high index-of-refraction contrast between silicon and silicon dioxide can be used to create sub-micron waveguides to confine light with spatial densities that are up to 100× larger than in a single-mode optical fiber. Furthermore, by using silicon-on-insulator (SOI) technology, a silicon waveguide can be surrounded by silicon dioxide on all four sides, which facilitates low-loss, on-chip waveguides and active devices (such as detectors and modulators). These silicon-based optical devices offer numerous advantages, including: miniaturization, low-energy modulation, the ability to integrate with other devices in silicon, and/or the ability to leverage the large, existing silicon manufacturing infrastructure.

Unfortunately, there are problems associated with silicon waveguides that are surrounded by a buried oxide or other like dielectric material. One major problem of such waveguides is that a thick buried oxide or other like dielectric material is needed to surround the waveguide core material in order to effectively confine light within the waveguide core material. This thickness requirement of the buried oxide or other dielectric material however causes heat dissipation problems within a chip. As such, there is a need to provide a waveguide structure in which the waveguide core material is surrounded by a buried oxide or other like dielectric material which efficiently confines light, yet is able to let the chip dissipate heat.

SUMMARY

A semiconductor structure is provided in which a plurality of waveguide structures are embedded within a semiconductor handle substrate. Each waveguide structure includes, from bottom to top, a bottom oxide portion, a waveguide core material portion and a top oxide portion. An oxide capping layer is present on topmost surfaces of each waveguide structure and a topmost surface of the semiconductor handle substrate. A plurality of semiconductor devices is located above a topmost surface of the oxide capping layer. The structure has thicker buried oxide regions defined by the combined thicknesses of the top oxide portion and the oxide capping layer located in some areas, while thinner buried oxide regions defined only by the thickness of the oxide capping layer are present in other areas of the structure.

In one aspect of the present application, a semiconductor structure is provided. In one embodiment of the present application, the semiconductor structure includes a plurality of waveguide structures embedded within a semiconductor handle substrate. Each waveguide structure of the plurality of waveguide structures of the present application includes, from bottom to top, a bottom oxide portion, a waveguide core material portion and a top oxide portion. Topmost surfaces of each waveguide structure of the plurality of waveguide structures are coplanar with a topmost surface of the semiconductor handle substrate. An oxide capping layer is located on the topmost surfaces of each waveguide structure of the plurality of waveguide structures and the topmost surface of the semiconductor handle substrate. A plurality of semiconductor devices is located above a topmost surface of the oxide capping layer. Each semiconductor device of the plurality of semiconductor devices includes a portion of a semiconductor material that is in direct contact with a portion of the topmost surface of the oxide capping layer.

In another aspect of the present application, a method of forming a semiconductor structure is provided. In one embodiment of the present application, the method includes providing a plurality of waveguide structures embedded within a semiconductor handle substrate. Each waveguide structure of the plurality of waveguide structures that is provided includes, from bottom to top, a bottom oxide portion, a waveguide core material portion and a top oxide portion. Topmost surfaces of each waveguide structure of the plurality of waveguide structures are coplanar with a topmost surface of the semiconductor handle substrate. An oxide capping layer is then formed on the topmost surfaces of each waveguide structure of the plurality of waveguide structures and the topmost surface of the semiconductor handle substrate. Next, a semiconductor material layer is provided on a topmost surface of the oxide capping layer. A plurality of semiconductor devices is formed above the topmost surface of the oxide capping layer. Each semiconductor device of the plurality of semiconductor devices that is formed comprises a portion of the semiconductor material layer.

DESCRIPTION

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements in the various embodiments of the present application are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application. For purposes of the description hereinafter, the terms "upper", "lower", "right", "left", "vertical", "horizontal", "top", "bottom", and derivatives thereof shall relate to the disclosed structures and methods, as oriented in the drawing figures.

Figure 1:
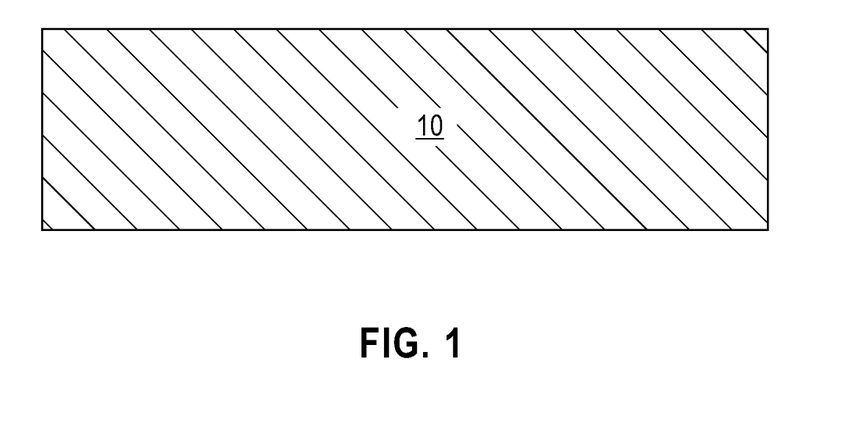
FIG. 1 is a cross sectional view of an exemplary semiconductor structure including a semiconductor handle substrate that can be employed in accordance with an embodiment of the present application.

Referring first to FIG. 1, there is illustrated an exemplary semiconductor structure that can be employed in accordance with an embodiment of the present application. Specifically, FIG. 1 illustrates a semiconductor handle substrate 10. In one embodiment of the present application, the semiconductor handle substrate 10 that is employed is a bulk semiconductor substrate. The term "bulk" as used in conjunction with the phrase "semiconductor substrate" denotes that the entire substrate is comprised of at least one semiconductor material.

In one embodiment of the present application, the semiconductor handle substrate 10 can be comprised of a single semiconductor material including, but not limited to, Si, Ge, SiGe, SiC, SiGeC, III/V compound semiconductors such as, for example, InAs, GaAs, and InP, and II/VI compound semiconductors. In another embodiment, the semiconductor handle substrate 10 can be comprised of two or more of the aforementioned semiconductor materials.

In one embodiment, at least a topmost surface of the semiconductor handle substrate 10 can be comprised of a single crystalline semiconductor material, such as, for example, single crystalline silicon or single crystalline germanium. In other embodiments, at least the topmost surface of the semiconductor handle substrate 10 can be comprised of a polycrystalline or an amorphous semiconductor material. The crystal orientation of the semiconductor handle substrate 10 may be {100}, {110}, or {111}. Other crystallographic orientations besides those specifically mentioned can also be used in the present application.

Figure 2:
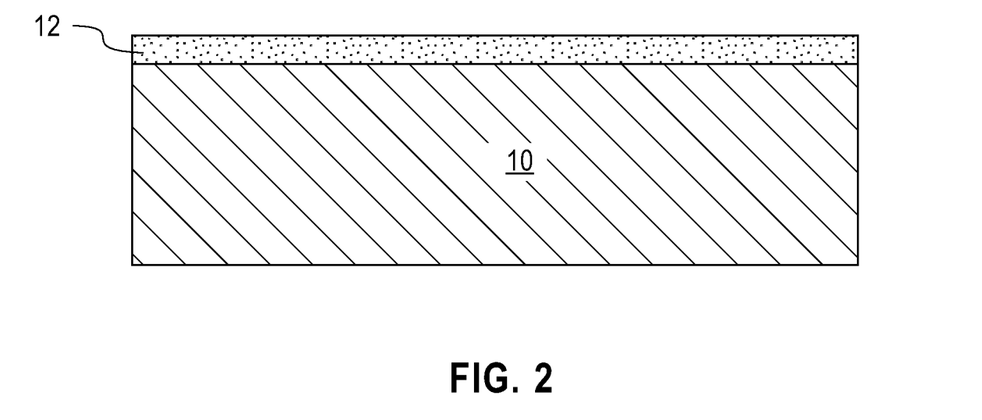
FIG. 2 is a cross sectional view of the exemplary semiconductor structure of FIG. 1 after forming a contiguous hard mask material layer on an exposed surface of the semiconductor handle substrate.

Referring now to FIG. 2, there is illustrated the exemplary semiconductor structure of FIG. 1 after forming a contiguous hard mask material layer 12 on an exposed surface of the semiconductor handle substrate 10. The term "contiguous" as used throughout the present application denotes that a material layer spans entirely across a surface of an underlying material layer without any breaks or voids in material layer.

The hard mask material layer 12 that is employed in the present application may include a semiconductor oxide, a semiconductor nitride and/or a semiconductor oxynitride. In one embodiment, the hard mask material that can be used in providing the hard mask material layer 12 can be comprised of silicon dioxide. In another embodiment, the hard mask material that can be used in providing the hard mask material layer 12 can be comprised of silicon nitride. In yet another embodiment, the hard mask material that can be used in providing the hard mask material layer 12 can be a stack comprised of, in any order, silicon dioxide and silicon nitride.

In some embodiments of the present application, the hard mask material that can be used in providing the hard mask material layer 12 can be formed by a deposition process such as, for example, chemical vapor deposition (CVD) or plasma enhanced chemical vapor deposition (PECVD). In other embodiments, the hard mask material that can be used in providing the hard mask material layer 12 can be formed by a thermal process such as, for example, thermal oxidation and/ or thermal nitridation. In yet other embodiments, the hard mask material that can be used in providing the hard mask material layer 12 can be formed by a combination of a deposition process and a thermal process. The thickness of the hard mask material that can be used in providing the hard mask material layer 12 can range from 10 nm to 200 nm, with a thickness from 50 nm to 100 nm being more typical.

Figure 3A:
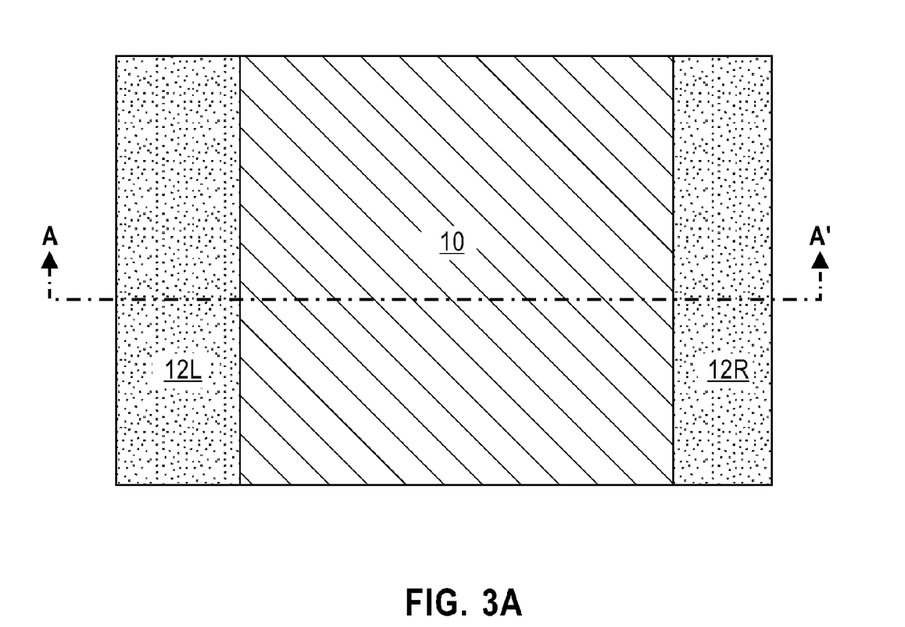
FIG. 3A is a top down view of the exemplary semiconductor structure of FIG. 2 after patterning the contiguous hard mask material layer to provide hard mask material portions.
Figure 3B:
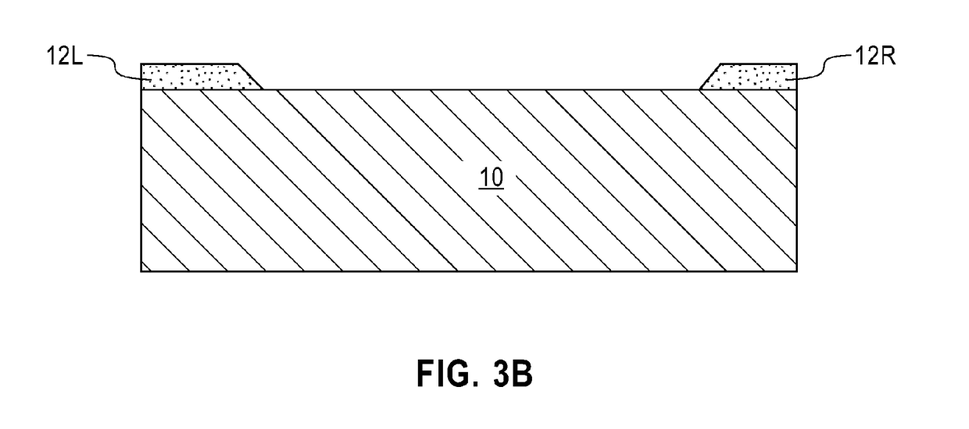
FIG. 3B is a cross sectional view of the exemplary semiconductor structure of FIG. 3A along vertical plane X-X'.

Referring now to FIGS. 3A-3B, there are illustrated the exemplary semiconductor structure of FIG. 2 after patterning the contiguous hard mask material layer 12 to provide hard mask material portions 12L, 12R. In some embodiments of the present application, the hard mask material portions 12L, 12R can contain at least one non-vertical sidewall surface (as shown in the drawings). In other embodiments of the present application, the hard mask material portions 12L contain vertical sidewall surfaces (not shown in the drawings). By "non-vertical" it is meant that at least one sidewall edge of the hard mask material portions 12L, 12R has an angle, as measured from the topmost surface to the sidewall edge, which is less than 90°. Typically, the hard mask material portions 12L, 12R have an angle, as measured from the topmost surface to the sidewall edge, which is from 40° to 90°.

The hard mask material portions 12L, 12R can be formed by patterning the contiguous hard mask material layer 12 by lithography and etching. Lithography includes forming a photoresist material (not shown) on the topmost surface of contiguous hard mask material layer 12, exposing the photoresist material to a desired pattern of radiation and then developing the exposed photoresist material with a resist developer to provide a patterned photoresist atop the contiguous hard mask material layer 12. An etch (isotropic or anisotropic) is then employed which transfers the pattern from the patterned photoresist material into the contiguous hard mask material layer 12L. In one embodiment, the etch used for pattern transfer may include a dry etch process such as, for example, reactive ion etching, plasma etching, ion beam etching or laser ablation. In another embodiment, the etch used for pattern transfer may include a wet chemical etchant. The etch is selective in removing the exposed portions of the contiguous hard mask material layer 12 that are not protected by the patterned photoresist material. After transferring the pattern into the contiguous hard mask material layer 12, the patterned photoresist material can be removed utilizing a resist stripping process such as, for example, ashing.

As shown in FIGS. 3A-3B, the hard mask material portions 12L, 12R protect portions of the semiconductor handle substrate 10, while leaving at least one other portion of the semiconductor handle substrate 10 exposed for further processing.

Figure 4A:
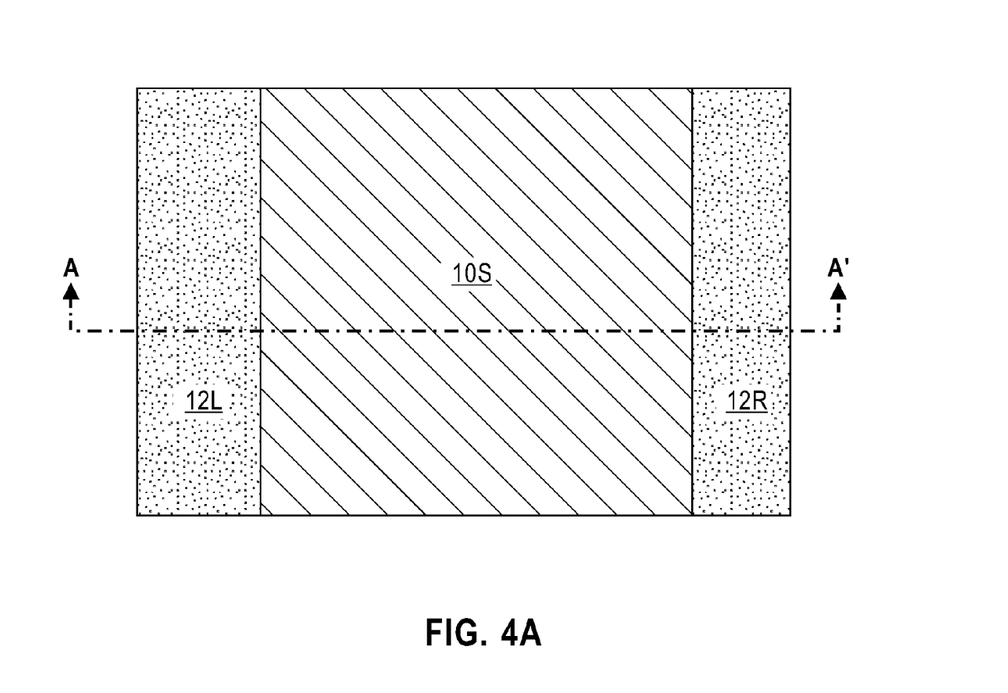
FIG. 4A is a top down view of the exemplary semiconductor structure of FIG. 3A after providing an opening within the semiconductor handle substrate utilizing each hard mask material portion as an etch mask.
Figure 4B:
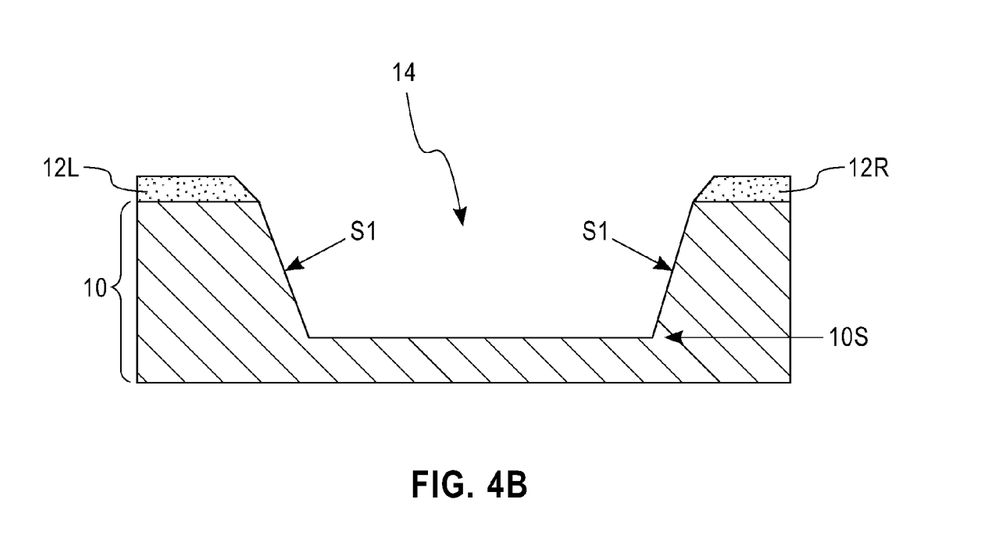
FIG. 4B is a cross sectional view of the exemplary semiconductor structure of FIG. 4A along vertical plane X-X'.

Referring now to FIGS. 4A-4B, there are illustrated the exemplary semiconductor structure of FIGS. 3A-3B after providing an opening 14 within the semiconductor handle substrate 10 utilizing each hard mask material portion 12L, 12R as an etch mask. Although a single opening is described and illustrated, a plurality of openings can be formed into the semiconductor handle substrate 10 at this point of the present application.

As is shown, the opening 14 exposes a sub-surface 10S of the semiconductor handle substrate 10. By "sub-surface" it is meant a surface of the semiconductor handle substrate 10 that is located between a topmost surface of the semiconductor handle substrate 10 and a bottommost surface of the semiconductor handle substrate 10. In one embodiment of the present application, the opening 14 exposes a sub-surface 10S of the semiconductor handle substrate 10 that is located from 0.5 micrometers to 10 micrometers beneath the topmost surface of the semiconductor handle substrate 10.

As is further shown, the opening 14 has sidewall surfaces S1, which when measured from the original topmost surface of the semiconductor handle substrate 10 to the vertical sidewall sidewalls, are non-vertical. By "non-vertical" it is meant that exposed sidewall surfaces S1 of the semiconductor handle substrate 10 within the opening 14 have an angle, as measured from the topmost surface to the sidewall surface, which is less than 90°. Typically, the exposed sidewall surfaces S1 of the semiconductor handle substrate 10 within the opening 14 have an angle, as measured from the topmost surface to the sidewall surface, which is from 40° to 80°.

An isotropic etch that is selective in removing a semiconductor material as compared to a dielectric material is employed to provide the structure shown in FIGS. 4A-4B. In one embodiment, the isotropic etch may include a dry etch process such as, for example, reactive ion etching, plasma etching, ion beam etching or laser ablation. In another embodiment, the isotropic etch used for pattern transfer may include a wet chemical etchant.

Figure 5A:
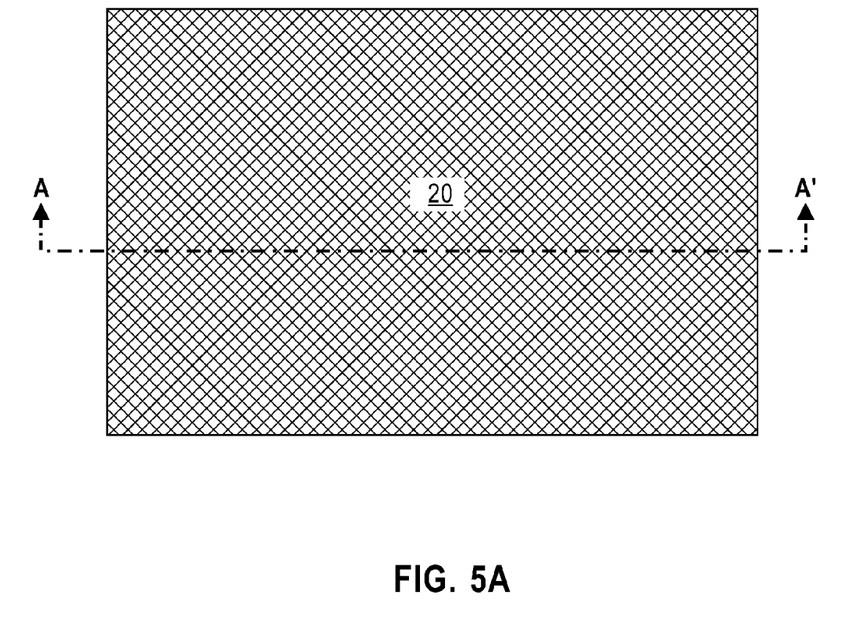
FIG. 5A is a top down view of the exemplary semiconductor structure of FIG. 4A after forming a waveguide material stack comprising, from bottom to top, a first contiguous oxide layer, a contiguous waveguide core material layer and a second contiguous oxide layer.
Figure 5B:
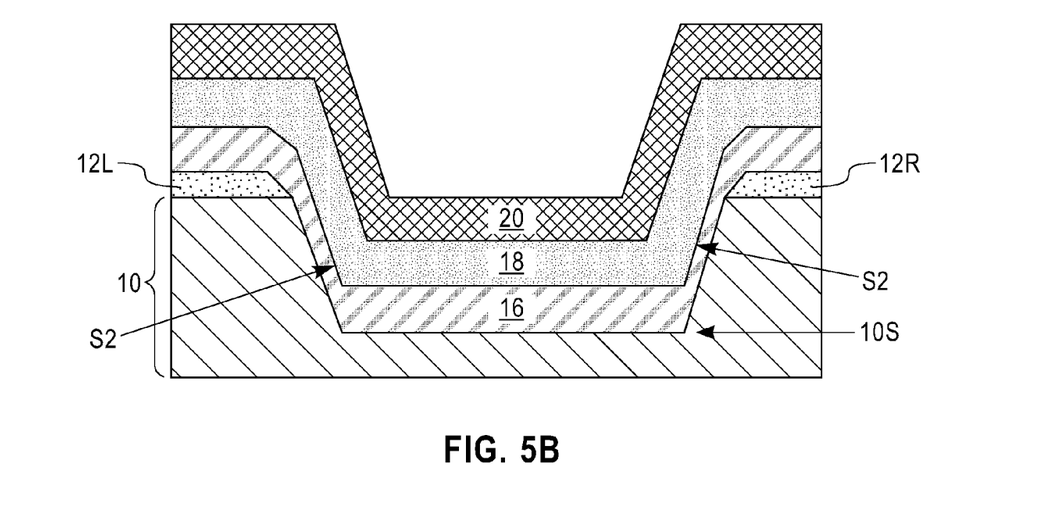
FIG. 5B is a cross sectional view of the exemplary semiconductor structure of FIG. 5A along vertical plane X-X'.

Referring now to FIGS. 5A-5B, there are illustrated the exemplary semiconductor structure of FIGS. 4A-4B after forming a waveguide material stack comprising, from bottom to top, a first contiguous oxide layer 16, a contiguous waveguide core material layer 18 and a second contiguous oxide layer 20. As is shown, a portion of each of the various layers 16, 18 and 20 of the waveguide material stack is formed within the opening 14, while other portions of each of the various layers 16, 18 and 20 of the waveguide material stack are formed atop the hard mask material portions 12L, 12R.

The first contiguous oxide layer 16 of the waveguide material stack is comprised of a dielectric oxide-containing material. In one embodiment of the present application, the first contiguous oxide layer 16 may comprise a semiconductor oxide such as, for example, silicon dioxide and germanium oxide. In another embodiment of the present application, the first contiguous oxide layer 16 may comprise a dielectric metal oxide. Examples of dielectric metal oxides that can be used as the dielectric material for providing the first contiguous oxide layer 16 include $HfO_2$, $ZrO_2$, $La_2O_3$, $Al_2O_3$, $TiO_2$, $SrTiO_3$, $LaAlO_3$, $Y_2O_3$, $HfO_xN_y$, $ZrO_xN_y$, $La_2O_xN_y$, $Al_2O_xN_y$, $TiO_xN_y$, $SrTiO_xN_y$, $LaAlO_xN_y$, $Y_2O_xN_y$, $SiON$, $SiN_x$, a silicate thereof, and an alloy thereof. Each value of x is independently from 0.5 to 3 and each value of y is independently from 0 to 2. In some embodiments, other dielectric materials with a refractive index smaller than the waveguide core material layer to be subsequently formed can be used instead of a dielectric oxide-containing material.

The first contiguous oxide layer 16 can be formed by a deposition process. Examples of deposition processes that can be used in providing the first contiguous oxide layer 16 include, for example, chemical vapor deposition (CVD), plasma enhanced chemical vapor deposition (PECVD), and atomic layer deposition (ALD). The thickness of the first contiguous oxide layer 16 can range from 1.5 micrometers to 3.0 micrometers. The thickness of the first contiguous oxide layer 16 depends on what wavelength is being used and confinement of the light in the waveguide.

As is further shown, the first contiguous oxide layer 16 within the opening 14 has sidewall surfaces S2 that are the same as S1 provided above. That is, the first contiguous oxide layer 16 within the opening 14 has non-vertical sidewall surfaces S2 that have an angle that is less than 90°. Typically, the sidewall surfaces S2 of the first contiguous oxide layer 16 within the opening 14 have an angle from 40° to 80°. Thus, the portion of the contiguous oxide layer 16 that is confined within the opening 14 and is present on sidewall surfaces S1 and having non-vertical sidewall surfaces S2 is configured to receive and transmit light.

Next, a contiguous waveguide core material layer 18 is formed on an exposed surface of the first contiguous oxide layer 16. The term "waveguide core material layer" is used throughout the present application to denote a material having a higher reflective index and thus light permittivity than the dielectric oxide-containing material that is used in the present application to subsequently surround the waveguide core material portion that is provided by the contiguous waveguide core material layer.

In one embodiment of the present application, the contiguous waveguide core material layer 18 is comprised of amorphous silicon or polycrystalline silicon. The term "amorphous" denotes that the silicon that provides the contiguous waveguide core material layer 18 lacks any well defined crystal structure. In another embodiment of the present application, the contiguous waveguide core material layer 18 is comprised of silicon nitride. In some embodiments, and when silicon nitride is used to provide the contiguous waveguide core material layer 18, the silicon nitride may have a silicon concentration of from 50% atomic percent to 80% atomic percent although other percentage is also acceptable.

The contiguous waveguide core material layer 18 can be formed by a deposition process including, for example, chemical vapor deposition and plasma enhanced chemical vapor deposition. The thickness of the contiguous waveguide core material layer 18 can range from 0.1 micrometers to 1.0 micrometers.

Next, a second contiguous oxide layer 20 is formed on the exposed surface of the contiguous waveguide core material layer 18. In one embodiment of the present application, the second contiguous oxide layer 20 is comprised of a same dielectric oxide-containing material as the first contiguous oxide layer 16. For example, both the first and second contiguous oxide layers 16 and 20 can be comprised of silicon dioxide. In another embodiment of the present application, the second contiguous oxide layer 20 is comprised of a different dielectric oxide-containing material as the first contiguous oxide layer 16. For example, the first contiguous oxide layer 16 may comprise silicon dioxide, while the second contiguous oxide layer 20 may comprise a dielectric metal oxide such as, for example, hafnium oxide.

The second contiguous oxide layer 20 can be formed utilizing one of the deposition processes mentioned above in forming the first contiguous oxide layer 16. The second contiguous oxide layer 20 can have a thickness within a range mentioned above for the first contiguous oxide layer 16.

Figure 6A:
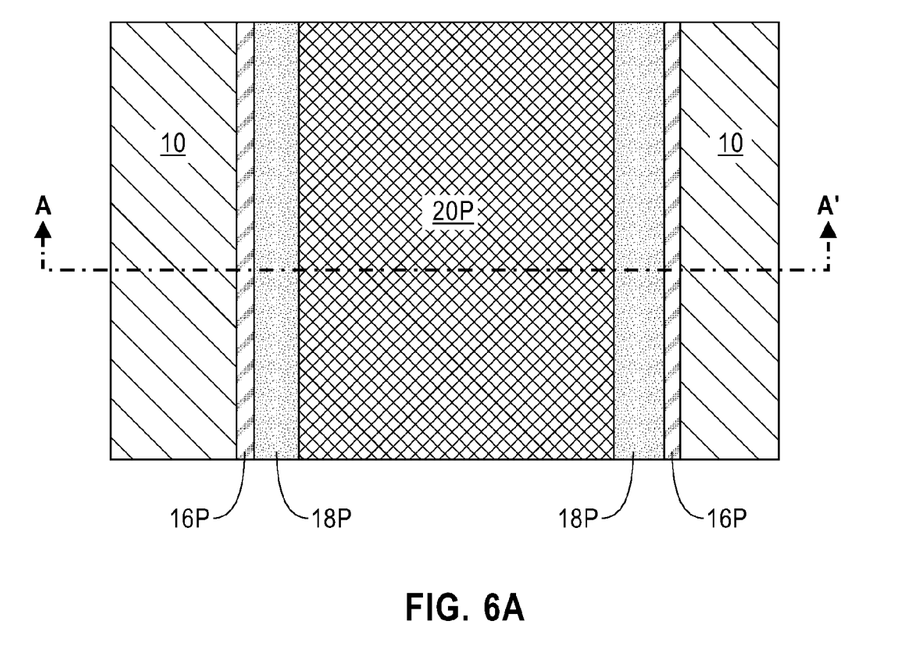
FIG. 6A is a top down view of the exemplary semiconductor structure of FIG. 5A after removing portions of the waveguide material stack and the hard mask material portions from the topmost surface of the semiconductor handle substrate to provide a waveguide material stack structure embedded within the opening in the semiconductor handle substrate, the waveguide material stack structure including, from bottom to top, a bottom oxide portion, a waveguide core material portion and a top oxide portion.
Figure 6B:
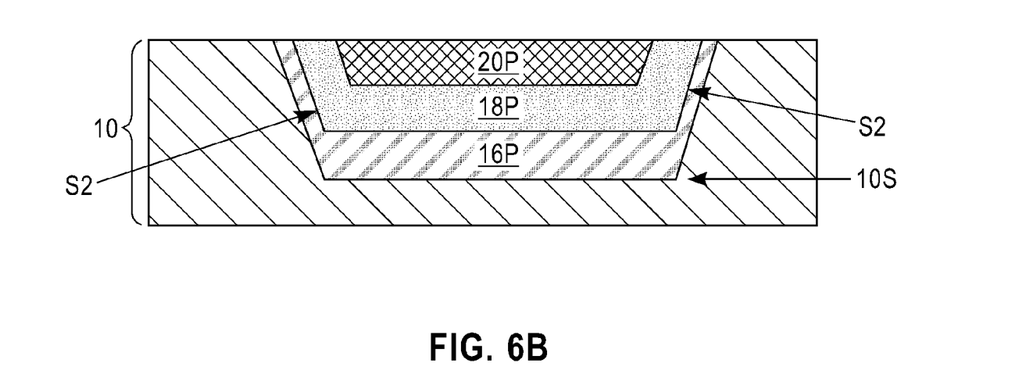
FIG. 6B is a cross sectional view of the exemplary semiconductor structure of FIG. 6A along vertical plane X-X'.

Referring now to FIGS. 6A-6B, there are illustrated the exemplary semiconductor structure of FIGS. 5A-5B after removing portions of the waveguide material stack and the hard mask material portions 12L, 12R from the topmost surface of the semiconductor handle substrate 10 to provide a waveguide material stack structure embedded within the opening 14 in the semiconductor handle substrate 10. The waveguide material stack structure includes, from bottom to top, a remaining portion of the first contiguous oxide layer 16 (referred to herein as a bottom oxide portion 16P), a remaining portion of the contiguous waveguide core material layer 18 (referred to herein as a waveguide core material portion 18P) and a remaining portion of the second contiguous oxide layer 20 (referred to herein as a top oxide portion 20P).

The bottom oxide portion 16P, the waveguide core material portion 18P, and the top oxide portion 20 that constituent the waveguide material stack structure have topmost surfaces that are coplanar with a topmost surface of the semiconductor handle substrate 10. Thus, no portions of the waveguide material stack structure are present on the topmost surface of the semiconductor handle substrate 10. Instead, the entirety of the waveguide material stack structure is confined within the opening 14 that is provided in the semiconductor handle substrate 10. As is shown, a portion of a bottommost surface of the bottom oxide portion 16P is in direct physical contact with sub-surface 10S of the semiconductor handle substrate 10, while other portions of the bottommost surface of the bottom oxide portion 16P are in direct physical contact with sidewall surfaces 51 of the semiconductor handle substrate 10.

The removal of portions of the waveguide material stack and the hard mask material portions 12L, 12R from the topmost surface of the semiconductor handle substrate 10 can be performed utilizing a planarization process such as, for example, chemical mechanical planarization and/or grinding.

Figure 7A:
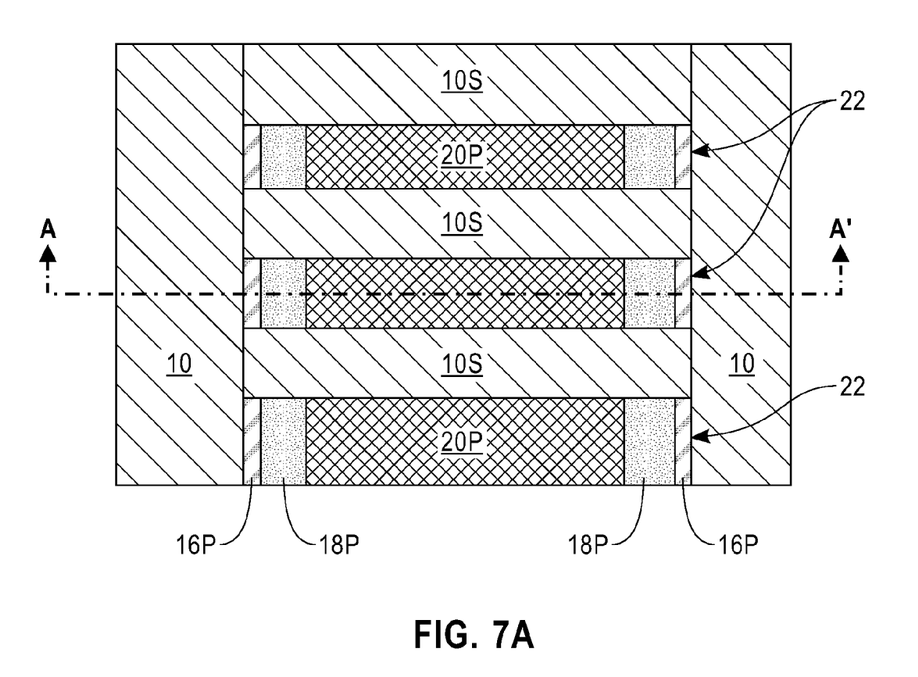
FIG. 7A is a top down view of the exemplary semiconductor structure of FIG. 6A after patterning the waveguide material stack structure to form waveguide structures embedded within the opening in the semiconductor handle substrate.
Figure 7B:
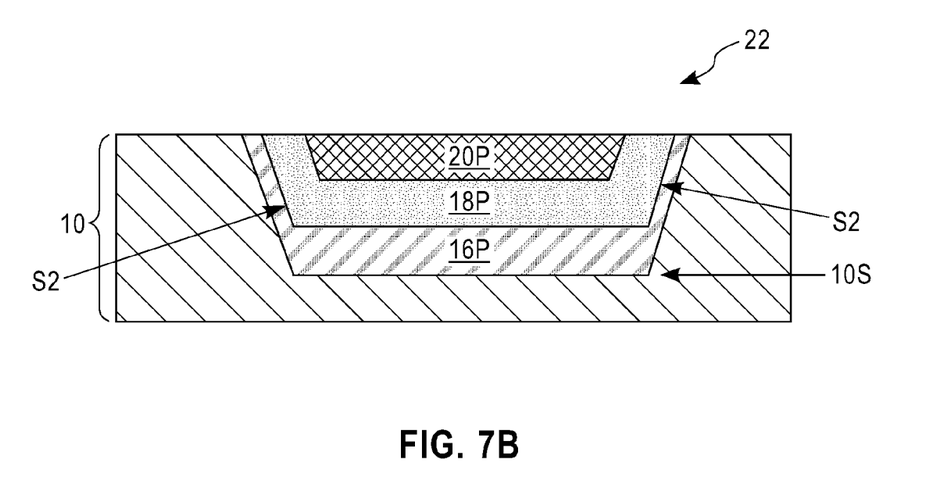
FIG. 7B is a cross sectional view of the exemplary semiconductor structure of FIG. 7A along vertical plane X-X'.

Referring now to FIGS. 7A-7B, there are illustrated the exemplary semiconductor structure of FIGS. 6A-6B after patterning the waveguide material stack structure to form waveguide structures 22 embedded within the opening 14 in the semiconductor handle substrate 10. Each waveguide structure 22 that is formed includes a patterned portion of the waveguide material stack structure described above. Thus, each waveguide structure 22 comprises, from bottom to top, an individual bottom oxide portion 16P, an individual waveguide core material portion 18P, and an individual top oxide portion 20P.

The bottom oxide portion 16P, the waveguide core material portion 18P, and the top oxide portion 20P that constituent the waveguide structure 22 each has a topmost surface that is coplanar with a topmost surface of the semiconductor handle substrate 10. Thus, no portions of the waveguide structure 22 are present on the topmost surface of the semiconductor handle substrate 10. Instead, the entirety of the waveguide structure 22 is confined within the opening 14 that is provided in the semiconductor handle substrate 10. As is shown, a portion of a bottommost surface of the bottom oxide portion 16P is in direct physical contact with sub-surface 10S of the semiconductor handle substrate 10, while other portions of the bottommost surface of the bottom oxide portion 16P are in direct physical contact with sidewall surfaces S1 of the semiconductor handle substrate 10.

Collectively, the bottom oxide portion 16P and the top oxide portion 20P of the waveguide structure 22 constituent a dielectric oxide-containing cladding structure that completely surrounds the waveguide core material portion 18P.

The patterning of the waveguide material stack structure described above can be performed by lithography and etching. The lithographic step used in patterning the waveguide material stack structure is the same as described above in patterning the contiguous hard mask material layer 12. The etching used to pattern the waveguide material stack structure comprises an anisotropic dry etching process or an anisotropic wet etching process. The patterning of the waveguide material stack structure that provides each waveguide structure 22 exposes portions of the sub-surface 10S of the semiconductor handle substrate 10 between each individual waveguide structure 22.

Figure 8A:
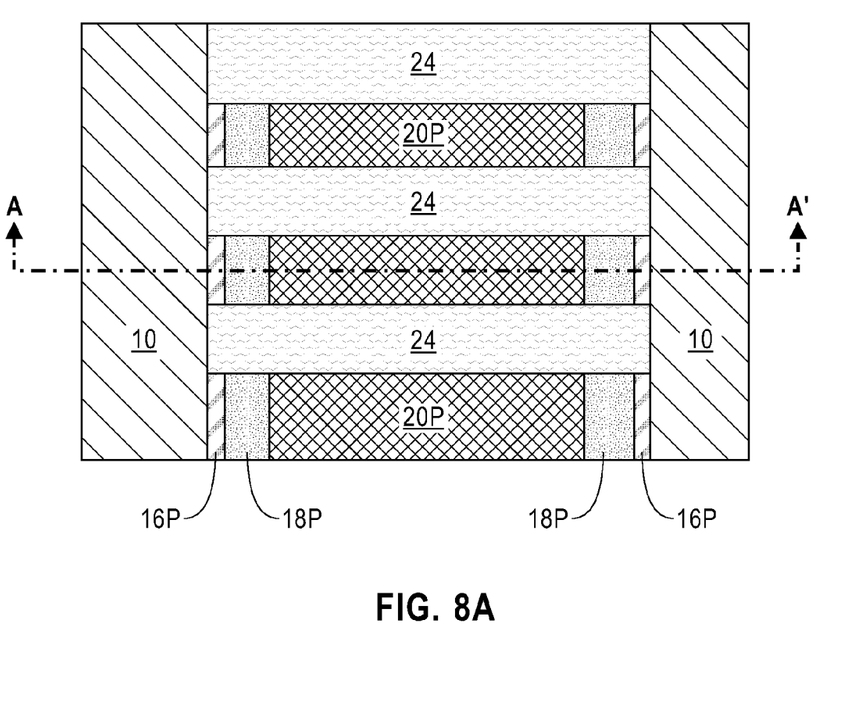
FIG. 8A is a top down view of the exemplary semiconductor structure of FIG. 7A after filling the space between each waveguide structure with an oxide fill material.
Figure 8B:
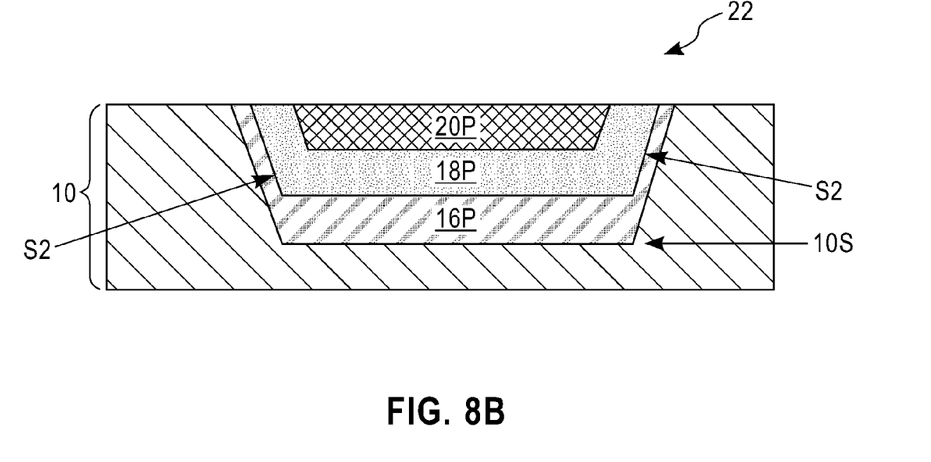
FIG. 8B is a cross sectional view of the exemplary semiconductor structure of FIG. 8A along vertical plane X-X'.

Referring now to FIGS. 8A-8B, there are illustrated the exemplary semiconductor structure of FIG. 7A after filling the space between each waveguide structure 22 with an oxide fill material 24. The oxide fill material can include a same or different dielectric oxide-containing material as that of the first and second contiguous oxide layers 16 and 20. In one embodiment, the oxide fill material 24 comprises silicon dioxide. The oxide fill material 24 can be formed by a deposition process. In some embodiments, a planarization process can be used after the deposition process to provide a planar structure as shown in FIGS. 8A and 8B in which the topmost surface of the oxide fill material 24 is coplanar with the topmost surface of the semiconductor handle substrate 10 and the topmost surface of the second oxide portion 20P of each waveguide structure 22.

Figure 9:
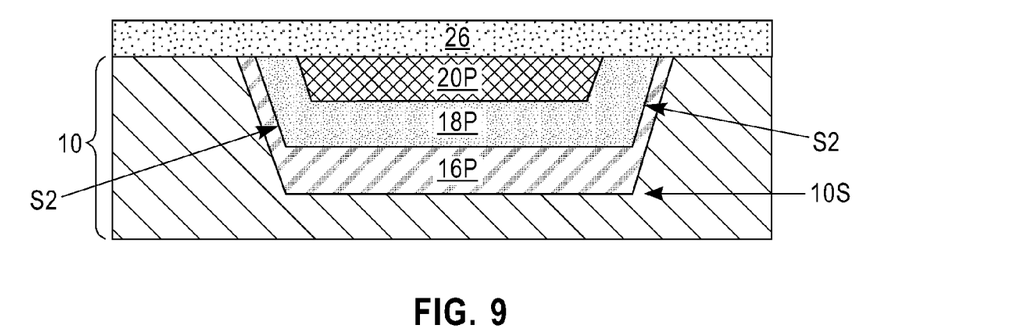
FIG. 9 is a cross sectional view (along vertical plane X-X') of the exemplary semiconductor structure of FIGS. 8A-8B after forming an oxide capping layer atop the semiconductor handle substrate and each waveguide structure.

Referring now to FIG. 9, there is illustrated the exemplary semiconductor structure of FIGS. 8A-8B after forming an oxide capping layer 26 atop the semiconductor handle substrate 10 and each waveguide structure 22; although not shown in the drawings, the oxide capping layer 26 is also formed atop the oxide fill material 24 that is located between each of the waveguide structures 22. As is shown, the oxide capping layer 26 is a contiguous layer which covers the entirety of the structure shown in FIGS. 8A-8B. The oxide capping layer 26 may include one of the dielectric oxide-containing materials mentioned above for the first and second contiguous oxide layer 16 and 20. In one embodiment, the oxide capping layer 26 may comprise a same dielectric oxide-containing material as the first and second contiguous oxide layers 16 and 20. For example, the first and second contiguous oxide layers 16 and 20 and the oxide capping layer 26 may comprise silicon dioxide. In another embodiment, the oxide capping layer 26 comprises a different dielectric oxide-containing material than the first and second contiguous oxide layer 16 and 20. For example, the first and second contiguous oxide layers 16 and 20 may be comprised of a dielectric metal oxide, while the oxide capping layer 26 comprises silicon dioxide. In some embodiments, other dielectric materials with a refractive index smaller than the waveguide core material can be used instead of a dielectric oxide-containing material for oxide capping layer 26.

The oxide capping layer 26 can be formed by a deposition process including, for example, chemical vapor deposition and plasma enhanced chemical vapor deposition. In some embodiments, and following the deposition of the oxide capping layer 26, a planarization process such as, for example, chemical mechanical planarization (CMP) and/or grinding may be employed. The oxide capping layer 26 has a thickness, t1, from 0.1 micrometer to 2.0 micrometers. The thickness of layer 26 is determined by device optimization on the top SOI layer.

Figure 10:
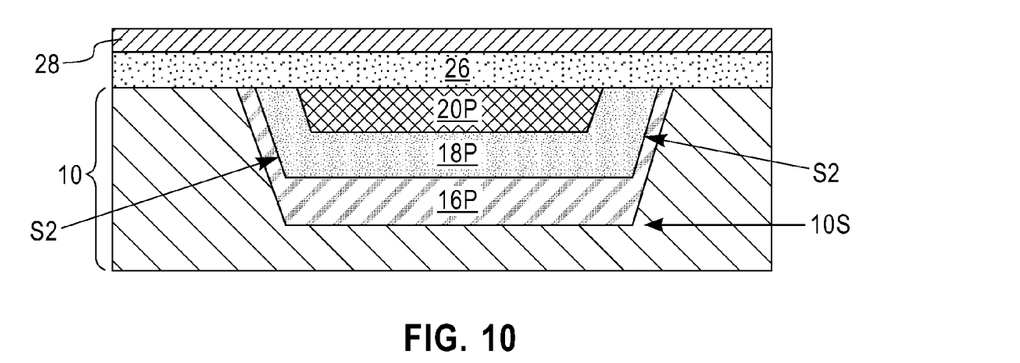
FIG. 10 is a cross sectional view of the exemplary semiconductor structure of FIG. 9 after providing a semiconductor material layer on an exposed surface of the oxide capping layer.

Referring now to FIG. 10, there is illustrated the exemplary semiconductor structure of FIG. 9 after providing a semiconductor material layer 28 on an exposed surface of the oxide capping layer 26. The semiconductor material layer 28 has a bottommost surface that is in direct physical contact with a topmost surface of the oxide capping layer 26. At this point of the present application, the semiconductor material layer 28 covers the entire topmost surface of the oxide capping layer 26. Moreover and at this point of the present application, the bottom oxide portion 16P, the top oxide portion 20P, the oxide fill material 24, and the oxide capping layer 26 may be referred to as buried oxides since they are located between the semiconductor handle substrate 10 and the semiconductor material layer 28.

The semiconductor material layer 28 may include one of the semiconductor materials as mentioned above for the semiconductor handle substrate 10. In one embodiment, the semiconductor material layer 28 may comprise a same semiconductor material as the semiconductor handle substrate 10. For example, both the semiconductor handle substrate 10 and the semiconductor material layer 28 may comprise single crystalline silicon. In another embodiment, the semiconductor material layer 28 comprises a different semiconductor material than the semiconductor handle substrate 10. For example, the semiconductor handle substrate 10 may be comprised of single crystalline silicon, while the semiconductor material layer 28 may be comprised of an III-V compound semiconductor or an II-VI compound semiconductor.

In some embodiments, the semiconductor material layer 28 comprises a single layer of semiconductor material. In other embodiments, the semiconductor material layer 28 can be comprised of two or more semiconductor materials. In one embodiment, at least a topmost surface of the semiconductor material layer 28 can be comprised of a single crystalline semiconductor material. In other embodiments, at least the topmost surface of the semiconductor material layer 28 can be comprised of a polycrystalline or an amorphous semiconductor material. The crystal orientation of the semiconductor material layer 28 may be {100}, {110}, or {111}. Other crystallographic orientations besides those specifically mentioned can also be used in the present application.

The semiconductor material layer 28 can be formed on the exposed topmost surface of oxide capping layer 26 by bonding. In one embodiment of the present application, the semiconductor material layer 28 is directly bonded to the exposed topmost surface of oxide capping layer 26 without the need of any intermediate layer or adhesive layer. In another embodiment (not shown), an intermediate layer such as a dielectric material, or an adhesive layer can be used.

In one embodiment of the present application, a direct bonding process can be employed. In a direct bonding process, the bonding can be achieved by bringing a surface of the semiconductor material layer 28 into direct physical contact with the exposed topmost surface of the oxide capping layer 26. The two structures are then heated to a temperature from 400° to 1000° C. in an inert ambient such as, for example, He, Ne, Ar and mixtures thereof. During the heating step, an externally applied force may be applied to the two structures to ensure sufficient mating between the semiconductor material layer 28 and the oxide capping layer 26.

In some embodiments, the semiconductor material layer 28 may include a transfer substrate which can be removed after the bonding process utilizing techniques well known to those skilled in the art.

Figure 11:
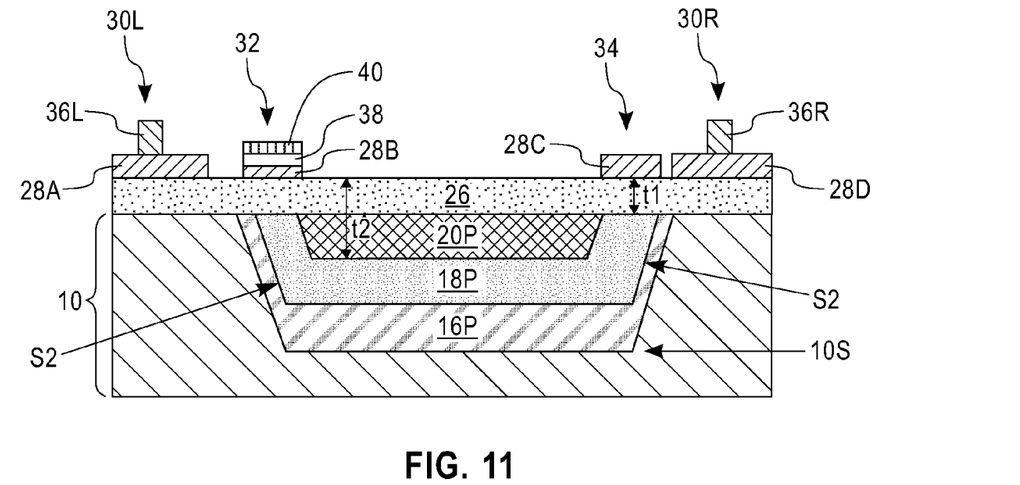
FIG. 11 is a cross sectional view of the exemplary semiconductor structure of FIG. 10 after forming a plurality of semiconductor devices using various portions of the semiconductor material layer as a substrate or component of each semiconductor device.

Referring now to FIG. 11, there is illustrated the exemplary semiconductor structure of FIG. 10 after forming a plurality of semiconductor devices 30L, 30R, 32 and 34 using various portions of the semiconductor material layer 28 as a substrate or component of each semiconductor device. In the structure disclosed in FIG. 11, a thickness of the top oxide portion 20P and a thickness of the oxide capping layer 26 (collectively denoted as t2) located above a portion of the waveguide core material portion 18P not directly beneath a semiconductor device 20L, 30R, 32, and 24 is greater than a thickness (denoted as t1) of the oxide capping layer 26 located directly beneath each semiconductor device 30L, 30R, 32 and 34 of the plurality of semiconductor devices. Thus, the structure of the present application provides improved heat dissipation without sacrificing light confinement efficiency within the waveguide core material portion 18P.

The various semiconductor devices 30L, 30R, 32 and 34 can be formed in any order utilizing techniques that are well known to those skilled in the art. In one embodiment and as illustrated, the plurality of semiconductor devices comprises a laser diode 32 located above one sidewall surface S2 of the bottom oxide portion 16P that is configured to receive and transmit light, a diode detector 34 located above another sidewall surface S2 of the bottom oxide portion 16P that is configured to receive and transmit light, a first metal oxide transistor 30L located laterally adjacent the laser diode 32, and a second metal oxide transistor 30R located laterally adjacent the diode detector 34. The first and second metal oxide transistors 30L and 30R are not located directly above any portion of the waveguide structure 22.

In one embodiment, the first metal oxide transistor 30L and the second metal oxide transistor 30R may be of a same conductivity type (i.e., n-type or p-type). In another embodiment of the present application, the first metal oxide transistor 30L and the second metal oxide transistor 30R may be of a different conductivity type. The first metal oxide transistor 30L and the second metal oxide transistor 30R include a gate structure 36L, 36R. The gate structure 36L, 36R includes, from bottom to top, a gate dielectric portion (not shown) and a gate electrode portion (also not shown). The gate structure 36L, 36R can be formed utilizing a gate first process or a gate last process. The processing details for a gate first process or a gate last process are well known to those skilled in the art and, as such, they are not provided herein so as not to obscure the present application. In the present application, element 28A denotes a semiconductor material layer portion (i.e., a first remaining portion of semiconductor material layer 28) for the first metal oxide transistor 30L and element 28D denotes a semiconductor material layer portion (i.e., a second remaining portion of semiconductor material layer 28), for the second metal oxide transistor 30R.

The gate dielectric portion of each gate structure 36L, 36R can be composed of a semiconductor oxide, a semiconductor nitride, and/or a semiconductor oxynitride. In one example, the gate dielectric portion of each gate structure 36L, 36R can be composed of silicon dioxide, silicon nitride and/or silicon oxynitride. In another embodiment of the present application, the gate dielectric portion of each gate structure 36L, 36R may include at least a dielectric metal oxide. Exemplary dielectric metal oxides that can be used as gate dielectric portion include, but are not limited to, $HfO_2$, $ZrO_2$, $La_2O_3$, $Al_2O_3$, $TiO_2$, $SrTiO_3$, $LaAlO_3$, $Y_2O_3$, $HfO_xN_y$, $ZrO_xN_y$, $La_2O_xN_y$, $Al_2O_xN_y$, $TiO_xN_y$, $SrTiO_xN_y$, $LaAlO_xN_y$, $Y_2O_xN_y$, SiON, $SiN_x$, a silicate thereof, and an alloy thereof. Each value of x is independently from 0.5 to 3 and each value of y is independently from 0 to 2. In some embodiments, a multilayered gate dielectric structure comprising different gate dielectric materials, e.g., silicon dioxide, and a dielectric metal oxide can be formed and used as the gate dielectric portion of each gate structure 36L, 36R.

In some embodiments of the present application, the gate dielectric portion of each gate structure 36L, 36R can be formed by a deposition technique such as, for example, chemical vapor deposition (CVD), plasma enhanced chemical vapor deposition (PECVD), physical vapor deposition (PVD), sputtering, or atomic layer deposition. In another embodiment of the present application, the gate dielectric portion of each gate structure 36L, 36R can be formed by a thermal growth technique such as, for example, thermal oxidation and/or thermal nitridation. In yet a further embodiment of the present application, a combination of a deposition process and thermal growth may be used in forming a multilayered gate dielectric structure.

The gate conductor portion of each gate structure 36L, 36R that can be used in the present application can be composed of doped polysilicon, doped silicon germanium, an elemental metal (e.g., tungsten, titanium, tantalum, aluminum, nickel, ruthenium, palladium and platinum), an alloy of at least two elemental metals, an elemental metal nitride (e.g., tungsten nitride, aluminum nitride, and titanium nitride), or multilayered combinations thereof. In one embodiment, an entirety of the gate conductor portion of each gate structure 36L, 36R is comprised of a doped polysilicon or doped polysilicon germanium. In another embodiment, a lower portion of the gate conductor portion of each gate structure 36L, 36R is comprised a conductive material other than doped polysilicon or doped polysilicon germanium, and an upper portion of the gate conductor portion of each gate structure 36L, 36R is comprised of doped polysilicon or doped silicon germanium.

The gate conductor portion of each gate structure 36L, 36R can be formed utilizing a deposition process including, for example, chemical vapor deposition (CVD), plasma enhanced chemical vapor deposition (PECVD), physical vapor deposition (PVD), sputtering, atomic layer deposition (ALD) or other like deposition processes.

Laser diode 32 is an electrically pumped semiconductor laser which consists of a third remaining portion 28B of the semiconductor material layer 28 which is doped to provide a semiconductor material of a first conductivity type, an intrinsic semiconductor material 38 and another semiconductor material 40 of a second conductivity type that is different from the first conductivity type. In one embodiment of the present application, the intrinsic semiconductor material 38 and/or the another semiconductor material 40 is(are) composed of a same semiconductor material as that of the third remaining portion 28B of semiconductor material layer 18. In another embodiment of the present application, the intrinsic semiconductor material 38 and/or the another semiconductor material 40 is(are) composed of a different semiconductor material as that of the third remaining portion 28B of semiconductor material layer 28. The dopants that provide the first and second conductivity type can be introduced into during the formation of the particular semiconductor material or after formation of a particular semiconductor material utilizing one of ion implantation and gas phase doping.

In some embodiments, the intrinsic semiconductor material 38 may have an epitaxial relationship with the third remaining portion 28B of semiconductor material layer 28, and the another semiconductor material 40 may have an epitaxial relationship with the intrinsic semiconductor material 38. In such an embodiment, an epitaxial growth process can be used in forming each of the intrinsic semiconductor material 38 and the another semiconductor material 40.

In another embodiment, the intrinsic semiconductor material 38 may have an epitaxial relationship with the third remaining portion 28B of semiconductor material layer 28, but the another semiconductor material 40 does not have an epitaxial relationship with the intrinsic semiconductor material 38. In such an embodiment, an epitaxial growth process can be used in forming the intrinsic semiconductor material 38, while the another semiconductor material 40 is formed by a deposition process other than an epitaxial deposition process.

In yet another embodiment, the intrinsic semiconductor material 38 does not have an epitaxial relationship with the third remaining portion 28B of semiconductor material layer 28, but the another semiconductor material 40 does have an epitaxial relationship with the intrinsic semiconductor material 38. In such an embodiment, an epitaxial growth process can be used in forming the another semiconductor material 40, while the intrinsic semiconductor material 38 is formed by a deposition process other than an epitaxial deposition process.

The diode detector 34 includes a fourth remaining portion 28C of the semiconductor material layer 28. The detector can be a p-i-n diode or other detector such as metal Schottky diode. For the sake of clarity only the fourth remaining portion 28C is shown in the drawings to represent the entire diode detector. The material of the detector/diode depends on what wavelength that needs to be detected and the efficiency of the detection.

In the embodiment illustrated in FIG. 11, the laser diode 32 generates a beam of light which is reflected into the waveguide core material portion 18P by the sidewall surface S2 of the bottom oxide portion 16P of each waveguide structure 22. The sidewall surface S2 of the first oxide portion at this end of opening 14 serves as a prism coupler. The beam of light is confined by the waveguide core material portion 18P and passes through the entire length of the waveguide core material portion 18P until it is reflected at the sidewall surface S2 of the bottom oxide portion 16P of the other end of the opening 14. The light beam reflected by the sidewall surface S2 of the bottom oxide portion 16P at the other end of the opening 14 is directed to the diode detector 34. The diode detector 34 receives the light and coverts the light into an electrical signal. The electrical signal from the diode detector 34 can then be used to drive digital or analog circuit such as a gate of the CMOS (i.e., 30L, 30R) or other digital circuitry.

While the present application has been particularly shown and described with respect to various embodiments thereof, it will be understood by those skilled in the art that the foregoing and other changes in forms and details may be made without departing from the spirit and scope of the present application. It is therefore intended that the present applica-

What is claimed as new is:

1. A method of forming a semiconductor structure, said method comprising:
   providing a plurality of waveguide structures embedded within a semiconductor handle substrate, each waveguide structure of said plurality of waveguide structures comprising, from bottom to top, a bottom oxide portion, a waveguide core material portion and a top oxide portion, wherein topmost surfaces of each waveguide structure of said plurality of waveguide structures are coplanar with a topmost surface of said semiconductor handle substrate;
   forming an oxide capping layer on said topmost surfaces of each waveguide structure of said plurality of waveguide structures and said topmost surface of said semiconductor handle substrate;
   providing a semiconductor material layer on a topmost surface of said oxide capping layer; and
   forming a plurality of semiconductor devices located above said topmost surface of said oxide capping layer, each semiconductor device of said plurality of semiconductor devices comprises a portion of said semiconductor material layer.

2. The method of claim 1, wherein said providing said plurality of waveguide structures embedded within said semiconductor handle substrate comprises:
   providing hard mask material portions having non-vertical sidewalls on said topmost surface of said semiconductor handle substrate;
   forming an opening in said semiconductor handle substrate utilizing each hard mask material portion as an etch mask;
   forming a waveguide material stack comprising, from bottom to top, a first contiguous oxide layer, a contiguous waveguide core material layer and a second contiguous oxide layer in said opening and atop each hard mask material portion;
   removing portions of said waveguide material stack and said hard mask material portions from said topmost surface of said semiconductor handle substrate to provide a waveguide material stack structure embedded within said opening in said semiconductor handle substrate, said waveguide material stack structure including, from bottom to top, said bottom oxide portion, said waveguide core material portion and said top oxide portion; and
   patterning said waveguide material stack structure to form said waveguide structures.

3. The method of claim 2, further comprising filling a space located between each waveguide structure with an oxide fill material.

4. The method of claim 2, wherein said forming said opening in said semiconductor handle substrate comprises an etch process that provides said opening with non-vertical sidewall surfaces.

5. The method of claim 4, wherein said bottom oxide portion of each waveguide structure of the plurality of waveguide structures has sidewall surfaces that are configured to receive and reflect light.

6. The method of claim 5, wherein said sidewall surfaces of said bottom oxide portion of each waveguide structure of the plurality of waveguide structures have an angle that is less than 90°.

7. The method of claim 1, wherein said waveguide core material portion of each waveguide structure of the plurality of waveguide structures comprises a material having a higher reflective index than said bottom oxide portion and said top oxide portion.

8. The method of claim 7, wherein said waveguide core material portion of each waveguide structure of the plurality of waveguide structures is selected from amorphous silicon, polycrystalline silicon and silicon nitride.

9. The method of claim 1, wherein said forming said plurality of semiconductor devices comprises, forming, in any order,
   a laser diode located at a first edge of each waveguide structure of the plurality of waveguide structures;
   a diode detector located above a second edge of each waveguide structure of the plurality of waveguide structures;
   a first metal oxide transistor located laterally adjacent said laser diode; and
   a second metal oxide transistor located laterally adjacent said diode detector.

* * * * *